May 25, 1937. A. HUB 2,081,869
SETTING AND WORK FEEDING TOOL FOR LACING HOOK MACHINES
Filed Feb. 7, 1935
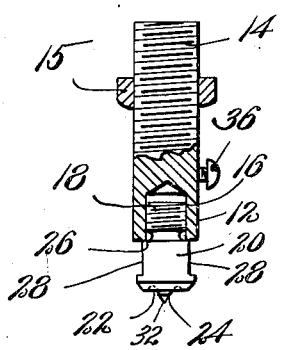
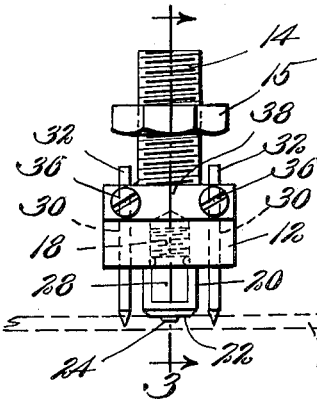
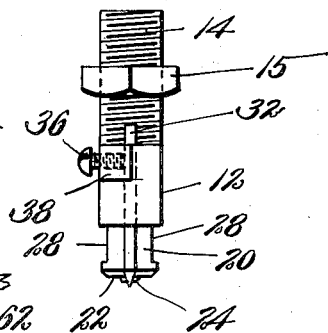
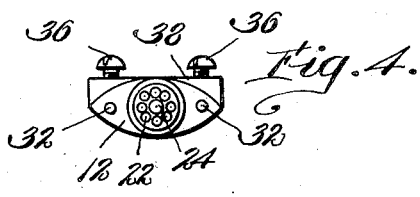
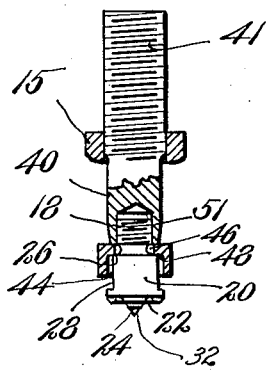
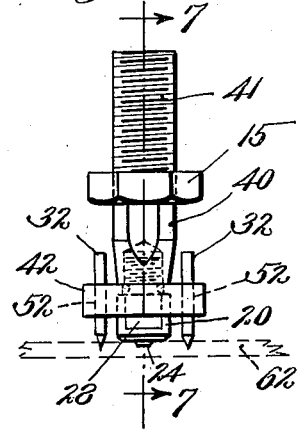
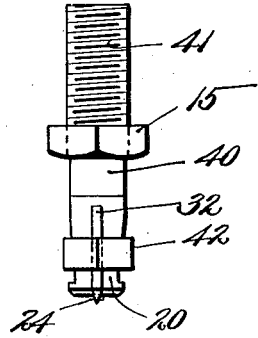
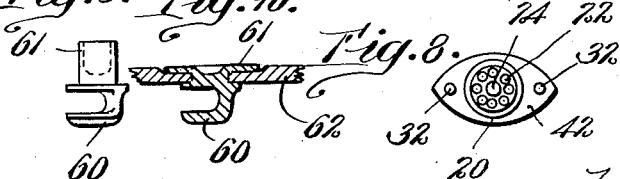
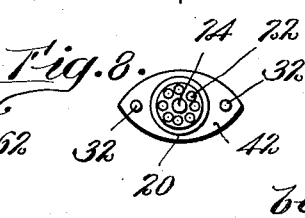
Inventor:
Alfred Hub
by Francis V. Dakin
Atty.

Patented May 25, 1937

2,081,869

UNITED STATES PATENT OFFICE 2,081,869

SETTING AND WORK FEEDING TOOL FOR LACING HOOK MACHINES

Alfred Hub, Chippewa Falls, Wis., assignor to Judson L. Thomson Mfg. Co., Waltham, Mass., a corporation of Massachusetts Application February 7, 1935, Serial No. 5,349

12 Claims. (Cl. 218—17)

This invention relates to a combined setting and work feeding tool for use in machines for setting lacing hooks of the character shown and described in United States Letters Patent No. 977,090, issued to Arthur R. Havener on November 29, 1910.

In machines of this character the work in which the lacing hooks are set is fed the required distance between hooks by the setting tool after each clenching operation. The tool is provided with a punch portion and an annular setting shoulder and, after the setting operation, the punch portion remains in the bore of the hook and serves as positive means for feeding the work.

In lacing studs, however, the bore in the shank or barrel of the stud does not open out through the body of the stud but is closed at its inner end, so that, when the machine is used for setting lacing studs, a tool having an annular setting shoulder with a central slightly protruding boss or pilot and no punch portion is substituted in the machine for the hook setting tool. Considerable difficulty in feeding the work has been experienced in the use of such machines for setting lacing studs because the central cavity in the clenched end of the stud is so shallow that the setting tool, when moved laterally to feed the work, frequently slips out of said cavity and fails to feed the work the required distance which spoils the work.

The main object of the present invention is the provision, for use in machines of the character described, of a tool adapted for setting lacing studs which is provided with positive means adapted for engaging the work to feed it on the lateral feeding movement of the tool.

A further object is to provide work feeding means which is adjustable and which will not mar or deface the work.

Other objects of the invention will be in part obvious and in part described hereinafter.

My invention contemplates a tool having a setting member adapted to clench the end of the barrel or shank of a lacing stud on the work and having means for engaging the work for feeding it when a feeding movement is imparted to the tool. Preferably, the work engaging means comprises one or more pointed members adapted to project into the wrong side of the work which is presented to the tool. The pointed member, when one is used, is preferably positioned in the center line of the path of feeding movement of the tool in advance of the setting member and, if two are employed, they are arranged on opposite sides of the setting member. Generally, the use of one work engaging member will be found sufficient to insure positive and accurate feeding of the work but when the work is relatively thin, it may be found advisable to use two to prevent swivelling of the work during the feeding movement.

In the accompanying drawing illustrating my invention, Figure 1 is a front elevation as viewed from the operator's seat of a combined setting and work feeding tool made in accordance with my invention, the work being shown in broken lines;

Fig. 2 is a side elevation of the same looking from right to left in Fig. 1;

Fig. 3 is a vertical sectional view on line 3—3 in Fig. 1 looking from left to right, the shank of the tool being shown in elevation;

Fig. 4 is a bottom plan view of the same looking upwardly in Fig. 1;

Fig. 5 is a view similar to Fig. 1 of a modified form of tool;

Fig. 6 is a side elevation of the same looking from right to left in Fig. 5;

Fig. 7 is a vertical sectional view on line 7—7 in Fig. 5, the shank of the tool being shown in elevation;

Fig. 8 is a bottom plan view of the modified form of set looking upwardly in Fig. 5;

Fig. 9 is a side elevation of a lacing stud; and

Fig. 10 is a sectional view of a lacing stud set in the work.

Referring to Figures 1 to 4 inclusive of the drawing illustrating one embodiment of the invention, a tool is shown comprising a head 12 having an integral threaded shank portion 14 for mounting the tool in a machine for setting lacing hooks or studs and a nut 15 for holding it in adjusted position therein. The bottom face of the head 12 is provided with a threaded bore 16 for receiving the threaded shank 18 of an anvil or set 20 having an annular setting shoulder 22 surrounding a shallow boss or pilot 24. The head of the set is of somewhat larger diameter than the shank to form a shoulder 26 adapted to engage the bottom face of the head 12 of the tool when the set is mounted therein. The set may be provided with flattened portions 28 on opposite sides for receiving a suitable tool to turn it into tight engagement with the lower face of the tool.

The head 12 of the tool is provided with a pair of vertical bores 30 on opposite sides of the set, in each of which bores is mounted a work engaging member, preferably in the form of a pin 32 having a sharpened point for penetrating the work a slight distance so as to feed it with the set when the tool is given a feeding movement. The pins are held in adjusted position by set screws 36, and, to form a bearing for the set screws, the head is provided with a rectangular extension or enlargement 38.

In the embodiment of the invention illustrated in Figures 5 to 8 inclusive, the tool is shown as being made in two parts, a shank member 40 in the form of a round bar having a threaded end portion 41 and a head 42 preferably in the form of an elliptical block which is secured to the shank member by the anvil or set 20. The head 42 has in its bottom face a recess 44 which opens out its top face through a circular opening 46 of less diameter than the recess thereby forming an interior annular shoulder 48 (Fig. 7) and when the shank of the set is passed through the opening 46 and threaded into the bore 51 of the member 40 and screwed up tightly, the shoulder 26 of the set engages the interior shoulder 48 of the head 42 to force it into tight engagement with the bottom end face of the shank 40.

The head 42 is provided at each end with a vertical bore 52 in which is mounted a work engaging member 32 of sharpened pin form. Preferably, the pins 32 are designed to fit the bores 52 tightly to eliminate the use of set screws for retaining them in adjusted position. The same form of set and the same form of work engaging member are used in both embodiments of the invention shown in the drawing.

One advantage of constructing the tool in two parts as shown in the second form of the invention is that it permits the work engaging members to be adjusted in any desired position around the set, that is, either in the center of the path of feed or in a line perpendicular to the line of feed or in any other position. This adjustment is accomplished by loosening the set to release the head 42, turning that member into the desired position and then tightening up the set to hold it in such adjusted position.

When the tool is to be used for setting lacing studs in a machine, for example, of the construction shown in the Letters Patent hereinbefore referred to, it is substituted for the member 50, shown in the drawings of that patent, the shank of the tool being threaded into the punch holder 52 and the machine is then operated in the usual manner. Lacing studs 60 (Fig. 9) are fed through a suitable raceway and presented shank 61 uppermost to the under side of the work, the shank is forced through the work 62 and its end is clenched by the set 20 in the tool upon the wrong side of the work which is uppermost. In performing this operation, the tool moves downwardly and the pins 32 are so adjusted in the tool that when the clenching is completed, the points of the pins have engaged and partially penetrated the work and when the tool moves laterally to feed the work, the pin or pins 32 insures an equal movement of the work. At the end of the feeding movement the tool moves upwardly, withdrawing the pin or pins from the work, and then back to its initial position.

It will be observed that since the wrong side of the work is uppermost, it is not marred or defaced by the penetration of the work engaging feeding members and yet a positive feeding of the work is insured at all times.

It is to be understood that my invention is not to be limited to the exact forms herein shown and described since it is capable of embodiment in various other forms within the scope of the following claims.

What I claim is:

1. A tool of the character described having an annular setting shoulder and a pair of work engaging members arranged adjacent opposite sides of said shoulder, said members having each a sharpened point for entering the work when said shoulder is in engagement therewith.

2. A tool of the character described having an annular setting shoulder and a pair of adjustable work engaging members arranged adjacent opposite sides of said shoulder, said members having each a sharpened point for entering the work when said shoulder is in engagement therewith.

3. A tool of the character described comprising a shank member having a threaded upper end, a head having a recess in its bottom face opening out of the top face thereof, a set mounted in said recess and having a stem threaded into the lower end of said shank for holding said head fastened to said shank, said head being provided with a bore and a work-engaging member adjustably mounted in said bore for projecting into the work when said set is in engagement therewith.

4. A tool of the character described comprising a shank member having a threaded upper end, a head having a recess in its bottom face opening out of the top face thereof, said recess having an interior annular shoulder adjacent said top face, a set mounted in said recess and having a stem threaded into the lower end of said shank for holding said head fastened to said shank, said head being provided with a bore and a work-engaging member adjustably mounted in said bore for projecting into the work when said set is in engagement therewith.

5. A tool of the character described comprising a shank member having a threaded end, a head having a recess in its bottom face opening out of the top face thereof, said opening being restricted to form an interior shoulder, a set mounted in said recess in engagement with said interior shoulder and having a stem projecting through said opening and threaded into the lower end of said shank for holding said head fastened to said shank, said head being provided with a bore and a work-engaging member adjustably mounted in said bore and having a sharpened point for projecting into the work when said set is in engagement therewith.

6. A tool of the character described comprising a shank having a threaded upper end, a head having a recess in its bottom face opening out of the top face thereof, a set mounted in said recess and having a stem projecting through said opening and threaded into the lower end of said shank for holding said head fastened to said shank, said head being provided with a pair of bores on opposite sides of said set and a work engaging member mounted in each of said bores for projecting into the work when said set is in engagement therewith.

7. A tool of the character described having an annular setting shoulder adapted for clenching the end of the barrel of a lacing stud or similar device upon the work and a work engaging member mounted in said tool in close proximity to said setting shoulder and having a sharpened point projecting below said setting shoulder for partially penetrating that portion of the work in which the lacing stud is set when said shoulder is in engagement with the clenched end of said stud.

8. A tool of the character described comprising a head, a set mounted in the lower face of said head and a work engaging member mounted in said head and having a sharpened point projecting slightly below said set for partially penetrating the work when said set is in engagement therewith.

9. A tool of the character described comprising a head, a set mounted in the bottom face of said head and a pin adjustably mounted in said head in close proximity to said set, said pin having a sharpened point projecting below said set for partially penetrating the work when it is engaged by said set.

10. A tool of the character described having an annular setting shoulder adapted for clenching the end of the barrel of a lacing stud or similar device upon the work and a work engaging pin mounted in said tool in close proximity to said setting shoulder and having a sharpened point projecting slightly below said shoulder for partially penetrating the work when said shoulder is in engagement with the clenched end of said stud.

11. A tool of the character described comprising a head, a set mounted in said head and a pair of work engaging members mounted in said head in close proximity to said set and on opposite sides thereof, each of said members being adapted to partially penetrate the work when said set is in engagement therewith.

12. A tool of the character described comprising a head, a set mounted in said head and a pair of work engaging pins adjustably mounted in said head in close proximity to said set and on opposite sides thereof, each of said pins having a sharpened point for partially penetrating the work when said set is in engagement therewith.

ALFRED HUB.